A. J. HALL.
CONTROL SYSTEM.
APPLICATION FILED SEPT. 10, 1915.

1,289,161.

Patented Dec. 31, 1918.
2 SHEETS—SHEET 1.

WITNESSES:
R. J. Ridge.
W. R. Coley

INVENTOR
Arthur J. Hall.
BY
Wesley J. Carr
ATTORNEY

UNITED STATES PATENT OFFICE.

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,289,161.   Specification of Letters Patent.   Patented Dec. 31, 1918.

Application filed September 10, 1915. Serial No. 50,102.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Control Systems, of which the following is a specification.

My invention relates to control systems for dynamo-electric machines, and it has special reference to systems for controlling the operation of electric locomotives or other similar vehicles that are propelled by means of polyphase induction motors which receive their energy from a single-phase source or distributing system through the agency of a so-called phase converter.

One of the objects of my invention is to provide a control system of the class above indicated that shall be relatively simple in arrangement and operation and particularly adapted for the multiple operation of a pair of half-units which together comprise an electric locomotive.

Another object of my invention is to provide a control system for a locomotive of the character indicated which may be governed by the operator from either of the half-units and which, moreover, shall embody means, under the control of the operator, for definitely determining whether a selected unit or both units shall be operated.

In a more specific aspect, an object of my invention is to provide a double-unit locomotive, such as referred to, each unit of which is provided with an independent phase converter, a starting motor therefor, a propelling or driving motor or motors, and accessory control apparatus, such as switches, relays and the like, and, in order to render the control of the locomotive, as a whole, flexible and adaptable for various conditions of service, I make provisions in each of the locomotive half-units for effecting the multiple operation of both units or for permitting the operator to select at will which of the unit equipments shall be operated.

A still further object of my invention is to provide adequate and automatic protective means for interlocking the control-circuit connections in such manner that, when the locomotive is being operated from one end or from the front half-unit, for instance, the governing master switches of the other or rear half-unit are rendered inoperative, so that if, by accident, these switches should be manipulated while the locomotive was being controlled from the front end, no changes in the control of circuit connections would be effected and, therefore, improper operation and disastrous results would be obviated.

A still further object of my invention is to provide a system of the general character under consideration, in which automatic means are employed for disconnecting the driving motors from the phase converter whenever the supply-circuit voltage fails, even for an instant, and to disconnect the phase converter from its supplying transformer in the event of a failure of the supply circuit voltage for a predetermined time interval, such, for instance, as five or six seconds.

When double-unit electric locomotives are employed, it is of course necessary to arrange the control system therefor in such manner that the locomotive may be operated in either direction from either end thereof, and, when phase converters are employed upon each of the locomotive units for supplying the driving motors, it is also desirable to place within the control of the operator, at either end of the locomotive, the selection of either phase converter or of both phase converters to be utilized during operation. In certain classes of service, where the traffic is heavy, as upon grades, both phase converters will be found necessary, while, in certain instances, either of the phase converters will be sufficient to carry the load. At other times, it may be necessary to utilize a specific converter by reason of the inoperativeness of the other.

I propose, therefore, to provide means whereby both of the phase converters may be concurrently started and brought up to speed from either end of the locomotive and be subsequently thrown upon the line or, in other words, connected to their respective supplying transformers in the event of the multiple operation, or whereby either of the converters may be so controlled.

It will be known in the art that, although the voltage relations of a phase converter under no-load or light-load conditions may be balanced, there is a material unbalancing thereof under load conditions by reason of the development of the phase distortions due to the reactive drops in the converter under these conditions. In order, therefore, to maintain the best operative conditions under various classes of service, it is desirable to provide means for adjusting the circuit connections of the converter with respect to its supplying transformer. so that substantially balanced conditions shall obtain, irrespective of the character of the service which is being handled. For best operation, therefore, different circuit connections of the phase converter are employed for light loads and for heavy loads during periods of acceleration and for regenerative periods when the locomotive and its train are coasting down grades, during which time, the train is braked and electrical energy is regenerated to the supply circuit, in accordance with well-known practice. These adjustments are effected as desired, and the circuit connections of the phase converter to the transformer are changed in accordance therewith.

For the purpose of precluding an improper operation of the apparatus, if one of the master switches of one of the units be manipulated when the operation of the locomotive is being governed from the master switches of the other unit, an electrically operated cutout switch is provided with each of the equipments, and the control-circuit connections are so interlocked with these switches that only one set of master switches is effective in governing the control of the system.

Inasmuch as it takes a considerable time to start up the phase converters and connect them to the line, it becomes desirable to provide means for insuring their connection to the supplying transformers except under no-voltage conditions that exist over a sufficient time interval to allow the converters to be reduced in speed to such value that it is dangerous to again supply them with full line voltage. Therefore, a relay is provided which is associated with the transformer and is energized and held closed several seconds after the failure of the line voltage to interlock the connecting switches between the converter and the transformer.

A second relay which is electrically associated with the primary windings of the supply transformer and responds instantly to the failure of voltage, is also employed and is interlocked with the balancing or regulating switches and with the motor-circuit switches in such manner as to cause them to be opened immediately upon the failure of voltage, whereby the load is at once disconnected.

Having set forth, in a general way, some of the objects which my invention is intended to accomplish and some of the reasons for rendering certain of the functions desirable, I shall now set forth the specific circuit connections embodied in my system of control and shall describe the operation thereof.

In so doing, the main-circuit connections and main-circuit apparatus will first be set forth, after which a description of the control-circuit apparatus and auxiliary control-circuit connections will be given.

In the accompanying drawings.

Inasmuch as the two unit equipments, both as regards main and auxiliary circuit apparatus and connections, are similar in every respect, it is not deemed necessary to describe the duplicate equipments, and, therefore, the following exposition will be confined to a single unit. It should be understood, however, that the control equipment of the second unit comprises like apparatus and connections, and for purposes of convenience and clearness, corresponding parts of the two equipments will be designated by the same reference characters, the numeral 1 following the apparatus of one unit and the numeral 2 the control devices of the other unit. For instance, PC1 indicates the phase converter of one of the equipments and PC2 that of the other.

Figures 1, 2, 3:
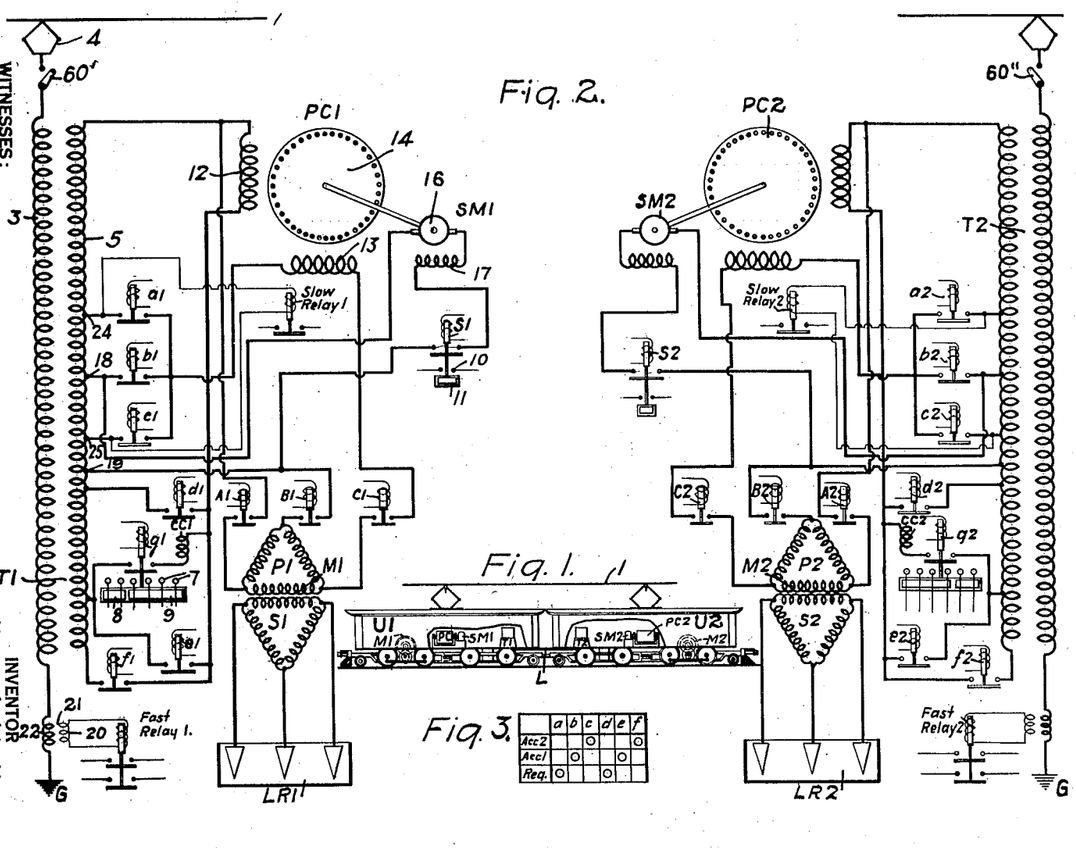
Figure 1 is a semi-diagrammatic view, in side elevation, of a complete electric locomotive, the control of which embodies my present invention.
Fig. 2 is a diagrammatic view of the main-circuit apparatus and circuit connections of the several unit equipments for the respective half-units of the locomotive shown in Fig. 1; the auxiliary control-circuit connections being omitted for the sake of clearness, although the auxiliary interlock switches are shown as associated with the main-circuit switches with which they actually coöperate.
Fig. 3 is a sequence chart indicating the positions of certain of the switches which correspond to certain positions of one of the master switches of either of the unit equipments.

Referring now particularly to Figs. 1 and 2, a trolley conductor 1 is adapted to supply alternating single-phase current to a locomotive L which comprises a plurality of half-units marked U1 and U2 which are suitably coupled together, as is customary in practice, and which may be operated concurrently through the employment of the multiple unit system of control which embodies my invention. The locomotive half-units are similar in all respects and unit U1 comprises a transformer T1, a phase converter PC1, a starting motor SM1, a polyphase induction driving motor M1, an adjustable resistor or liquid rheostat LR1, a plurality of relay switches marked "Fast relay 1" and "Slow relay 1," a plurality of motor-circuit switches A1, B1, C1, a starting switch $s1$, a main connecting switch $g1$, and a plurality of regulating or balancing unit switches $a1$, $b1$, $c1$, $d1$, $e1$ and $f1$.

The supply transformer T1 comprises a primary winding 3, one end of which is connected to the supply-circuit trolley conductor 1 through a suitable pantograph trolley or current-collecting device 4, while the other end thereof is grounded at G. A secondary transformer winding 5 is associated therewith, and the several regulating switches $a1$ to $f1$, inclusive, as well as the connecting switch $g1$, are associated with corresponding taps in the winding 5 and are adapted to complete circuit connections thereto.

The switches referred to, as well as the starting switch $s1$ and the motor-circuit switches A1, B1, C1, may be of any well-known construction and, moreover, may be either electrically operated or operated electro-pneumatically, as is old in the art. Certain of the switches mentioned are provided with the auxiliary interlock switches, for instance, switch $g1$ has associated therewith a set of stationary contact terminals 7 and a plurality of movable conducting members 8 and 9, while the starting switch $s1$ is provided with coöperative stationary and movable contact members 10 and 11. The interlock switches just enumerated are arranged to close their respective circuits in their "in" positions, that is, when the switches with which they are associated are energized and closed.

The phase converter PC1 may be of any type that is familiar in the art, although I have illustrated, and preferred to employ, a converter of the induction type which embodies a stator provided with a plurality of windings 12 and 13 that are disposed in quadrature relation and are inductively related to a rotor 14 that may conveniently be of the squirrel-cage type. The winding 12 is the exciting winding of the converter and is adapted to be connected across the major portion of the transformer secondary winding 5 by the connecting switch $g1$ which is always maintained closed during operation, a choke coil CC1 being connected in circuit therewith for the purpose of limiting the flow of current when the converter is thrown upon the line and when the connections thereof are being shifted.

The winding 13 is the generator winding, and the electromotive force developed therein is in quadrature with the phase of the line voltage. One terminal of the converter winding 13 is adapted to be connected to substantially the mid-point of the transformer winding 5 by the switch $b1$, while the other end thereof is connected to the primary winding P1 of the driving motor M1 through the motor-circuit switch C1. The motor primary winding P1 is also connected to the transformer winding 5 through the motor-circuit switches A1 and B1.

With this arrangement of apparatus and circuit connections, which substantially correspond to the well-known Scott or T-connection, it is evident that balanced three-phase voltages are supplied to the driving motor M1.

As already referred to, compensation for the phase distortion and voltage reduction of the phase converter under different load conditions is necessary and, therefore, the excitation of the converter may be varied by suitable manipulation of the regulating switches $d1$, $e1$ and $f1$, while the necessary correction for phase displacement may be accomplished by shifting the point of connection of the converter winding 13 to the transformer winding 5 by means of the regulating switches $a1$, $b1$, and $c1$.

The driving motor M1 pertains only indirectly to my invention and may be of any form that is old and familiar, although I have illustrated a polyphase induction motor of the delta-connected type, having primary windings P1 and secondary windings S1. The secondary windings S1 are conveniently connected to an adjustable liquid rheostat LR1 by means of which the acceleration of the driving motor M1 may be governed at will. Any other suitable adjustable resistor may be employed.

Mechanically and rigidly associated with the rotor 14 of the phase converter PC1 is the starting motor SM1 which comprises, preferably, a single-phase commutator motor embodying an armature 16 and a field-magnet winding 17 that is connected in series relation therewith. The starting motor SM1 is adapted to be connected across a portion of the transformer winding 5 between the taps 18 and 19 through the starting switch S1.

The "fast relay 1" is energized from a secondary winding 20 of an auxiliary transformer 21 having a primary winding 22 that is connected between the primary winding 3 of the main supply transformer and the ground G, and said relay is adapted to be energized to complete the circuit which it controls, whenever energy is supplied to the main supply transformer T1. This relay, however, is adapted to be deënergized instantly whenever the voltage of the supply circuit fails.

The "slow relay 1" is connected across a portion of the transformer secondary winding 5 between the taps 24 and 25 and is also energized as long as voltage obtains on the trolley conductor 1. Moreover, by reason of the peculiar connections of the system, hereinbefore set forth, and in view of the fact that the converter has a tendency to regenerate energy for a few seconds after the failure of the supply-circuit voltage, the "slow relay 1" is held up or energized for a few seconds in the event of such a development in circuit conditions.

Having set forth briefly the main-circuit apparatus and circuit connections, the auxiliary control-circuit devices and connections will be considered.

Figure 4:
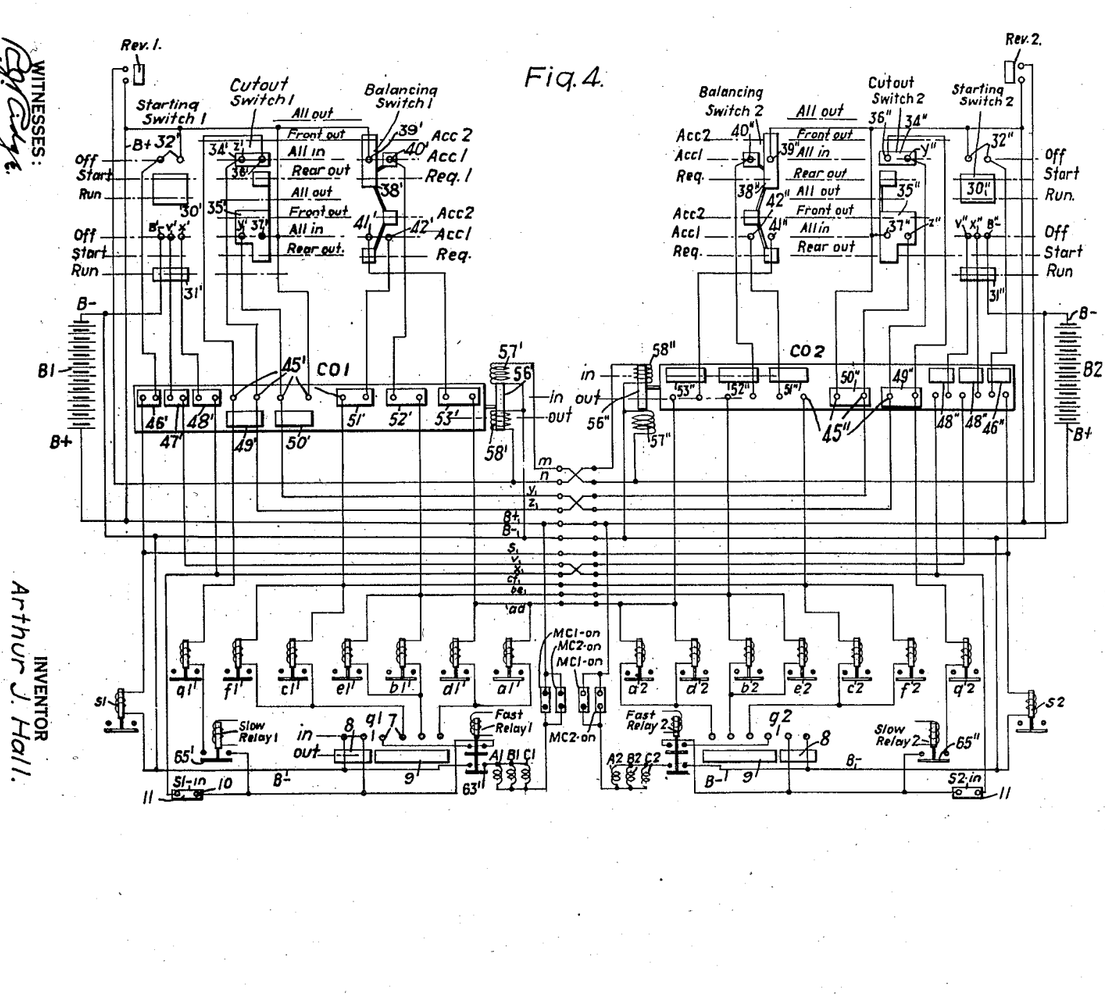
Fig. 4 is a diagrammatic view of the auxiliary control apparatus and control-circuit connections for governing the operation of the main-circuit apparatus shown in Fig. 2. The several interlock switches, however, are not associated with their corresponding control switches, by which they are actuated, but are illustrated as distributed throughout the diagram for the purpose of simplification and ready understanding.

Reference may therefore be had to Fig. 4 which shows the complete circuit connections and auxiliary control-devices of both of the unit equipments of the respective locomotive half-units. The equipment of unit U1 embodies a plurality of manually-operated master switches respectively marked "Rev. 1", "Starting switch 1", "Cutout switch 1", and "Balancing switch 1", while the equipment of unit U2 embodies a plurality of corresponding switches.

The switch Rev. 1 is normally open and must be manually closed whenever it is desired to operate the locomotive from the half-unit U1. In actual practice, this switch may best be associated with the ordinary reverser drum of the master controller in such manner that it will be closed whenever the reverser is moved from its "off" position to either its forward or its reverse position. In this way, the closure of the switch Rev. 1 is insured whenever the operator attempts to start the locomotive.

The starting switch 1 comprises a plurality of movable conducting segments 30' and 31' which are respectively adapted to engage stationary contact terminals 32' and contact terminals B'—, v' and x' upon the position-indicating lines marked "Off", "Start" and "Run".

The cutout switch 1 embodies a plurality of movable connecting segments 34' and 35' which are respectively adapted to coöperatively engage stationary contact terminals z' and 36' and the stationary contact terminals y' and 37' upon the position-indicating lines marked "Front out", "All in", and "Rear out".

The balancing switch 1 comprises a movable conducting segment 38' which is adapted to engage the stationary contact terminals 39', 40', 41' and 42' upon the position-indicating lines designated "Acc. 2", "Acc. 1", and "Reg."

For the purpose of interlocking the several master switches just described in order to prevent the accidental control of the electric locomotive from both ends at the same time, the locomotive half-units U1 and U2 are respectively provided with interlocking switches CO1 and CO2. The interlocking switch CO1 comprises a row of stationary contact terminals 45' and a plurality of movable conducting segments 46', 47', 48', 49', 50', 51', 52' and 53' which are adapted to engage said terminals in the "in" and "out" positions of the switch. The interlocking switch CO1 is operated electrically through the agency of electromagnetic means comprising a magnetizable core 56' which is associated with the movable segments 46' to 53', inclusive, and a plurality of energizing or operating coils 57' and 58' which, when energized, respectively move the switch CO1 into its "in" or its "out" positions, as will be understood.

The two equipments are also provided with separate auxiliary sources of energy or storage batteries B1 and B2 which are connected in multiple through the train line conductors B+ and B—, while a plurality of other train-line conductors $m$, $n$, $y$, $z$, $s$, $v$, $x$, $cf$, $be$, and $ad$ are provided whereby the multiple-unit operation of the two locomotive half-units is effected.

Obviously, both unit equipments U1 and U2 are provided with suitable master controllers for governing the operation of their respective liquid rheostats LR1 and LR2 and thereby the acceleration of their driving motors M1 and M2.

However, inasmuch as my invention pertains only indirectly to the master controllers, it is not deemed necessary to illustrate them. My invention is, nevertheless, concerned incidentally with certain interlock switches which are preferably associated with the respective master controllers for determining the operation of the main motor switches A1, B1, C1 and A2, B2 and C2, when one of the master controllers occupies a running or "on" position. These interlock switches are shown in Fig. 4 and are designated MC1—on and MC2—on.

Assuming that alternating-current energy is supplied to the trolley conductor 1 and that the liquid rheostats LR1 and LR2 are free from electrolyte, the two equipments of the respective half-units U1 and U2 may be operated in multiple in the following manner: The primary switches 60' and 60" are first closed to connect the transformers T1 and T2 to the source of energy. As soon as this is accomplished, fast relay 1 and fast relay 2 are energized and raised, although no other operation results without further manipulation of some of the master switches.

If it is desired to operate the electric locomotive from unit U1, the operator first closes the switch Rev. 1, thereby completing a circuit from the train line conductor B+, which includes the switch Rev. 1, and train-line conductor $n$, where the circuit divides, one branch including the operating coil 58' of interlocking switch CO1, and thence to the B— train-line conductor, and the other branch including the operating coil 58″ of switch CO2 and thence to the B− conductor.

Upon the energization of the operating coils mentioned, the respective interlocking switches CO1 and CO2 are thrown into the positions shown in the diagram, if they do not already occupy said positions. If, however, these interlocking switches are already in the position shown, no further movement thereof is effected, although the operating coils 58′ and 58″ are supplied with energy. It will be noted that the interlocking switch CO1 occupies its "in" position, while the switch CO2 is in its "out" position. These interlocking switches therefore function oppositely in accordance with the particular end of the locomotive from which it is desired to control the locomotive operation, and, in the instance under consideration, the control circuits from the master switches of the locomotive unit U1 are rendered operative for effecting the multiple operation of the two half-units, while the interlocking switch CO2 of the second half-unit is adapted to either interrupt the control circuits through the corresponding master switches or to short-circuit said switches in such manner that, even though they be manipulated, they have no effect upon the operation of the system as a whole, as will be hereinafter more fully set forth.

The next operation to be performed is to bring the several phase converters PC1 and PC2 up to speed and to connect them to their respective transformers. This is accomplished by first moving the starting switch 1 to its "start" position, thereby completing a circuit from the conductor B+ which includes contact terminals 32′ that are bridged by the conducting segments 30′, interlocking switch 46′, and train-line conductor s, where the circuit divides, one branch traversing the operating coil of the starting switch s1 to the conductor B−, and the other branch traversing the operating coil of the starting switch s2 to the conductor B−. The starting switches s1 and s2, therefore, are energized and closed. Thus, the several starting motors SM1 and SM2 are supplied with energy from the transformers T1 and T2 through the respective starting switches s1 and s2. Under these conditions, the starting motors are started into operation to bring the rotors 14 of the respective phase converters PC1 and PC2 up to full-running synchronous speed. This starting operation requires a rather definite amount of time, and, after the requisite period has expired, thereby insuring the attainment of synchronous speed, the starting switch 1 may be moved into its position marked "run".

As soon as the starting switch 1 occupies its "run" position, a circuit is established from the B+ conductor through the contact terminals 37′ and y′, which are bridged by the conducting segment 35′ of the cutout switch 1, train-line conductor y, conducting segment 49″ of interlocking switch CO2, energizing coil of connecting switch g2, coöperating contact members 65″ of the slow relay 2, interlock switch 11—S2—in of the starting switch s2, train-line conductor v, connecting segment 47′ of switch CO1, and thence, through contact terminals v′ and B′−, to the conductor B−.

Another circuit is simultaneously established from conductor B+, which includes a multiple circuit either through contact terminals 37″ and z″, which are bridged by the conducting segment 35″ of cutout switch 2 or through interlock switch 50″, and thence through train-line conductor z, contact terminals z′ and 36′, which are bridged by the conducting segment 34′ of cutout switch 1, energizing coil of connecting switch g1, coöperating contact members 65′ of the slow relay 1, and interlocking switch 11—s1—in of starting switch s1 to the B− conductor.

Upon the completion of the circuits just traced, the connecting switches g1 and g2 are energized and closed to connect the respective exciting windings 12 of the several phase converters PC1 and PC2 across their supply transformer secondary windings 5 and in circuit with the current-limiting choke coils CC1 and CC2.

As soon as the connecting switch g1 is closed, its associated interlock switches 8—g1—in and 9—g1—in are actuated into their closed positions. Therefore, a holding circuit is established in multiple to the starting switch interlock 11—s1—in from the negative side of the slow relay 1 which includes interlock switch 8—g1—in of the switch g1, and thence to the B− conductor. A similar holding circuit is established through the interlock switch 8—g2—in of the connecting switch g2. It is evident that, after these circuits have been completed, the starting switch 1 may be moved to its "off" position, thereby deënergizing the respective starting switches s1 and s2 and permitting them and their associated interlock switches 11 to be opened.

Concurrently with the completion of the circuits just traced, the closure of the switch g1 also completes a circuit from the B+ conductor that includes contact terminals 39′ and 40′ which are bridged by the conducting segment 38′ of the balancing switch 1, interlock switch 52′, and train-line conductor be, where the circuit divides, one branch traversing the energizing coils of the regulating or balancing switches b1 and e1 in parallel, and thence, through interlock switch 9—g1—in of the connecting switch g1, the upper set of coöperating contact members 67′ of the fast relay 1, and interlock switch 8—g1—in to the B− conductor.

The other branch of the circuit traverses the energizing coils of the balancing switches $b2$ and $e2$ in parallel after which it is completed through the interlock switch 9—$g2$—in of the switch $g2$, the upper contact members 67″ of the fast relay 2 and interlock switch 8—$g2$—in of the switch $g2$ to the B— conductor. The balancing switches $b1$ and $e1$ of the unit U1, and $b2$ and $e2$ of unit U2 are thus energized and closed. The several converter generator windings 13 of the respective phase converters PC1 and PC2 are thus connected to the taps 18 of the respective supply transformers T1 and T2. The connections, thus effected, are particularly adapted to insure balanced voltage relations when the electric locomotive is accelerated under relatively light loads.

Having thus brought the two converters up to speed and connected them to their supply transformers, a suitable master controller MC1 (not shown) for regulating the liquid rheostats LR1 and LR2 may be manipulated in any convenient manner. As soon as the master controller is moved into one of its running or "on" positions, the several motor-circuit switches A1, B1 and C1, and A2, B2 and C2 are energized and closed, a circuit being established from the train-line conductor B+, which includes interlock switch MC1—on, the energizing coils of the switches A1, B1 and C1, and the lower set of contact members 63′ of the fast relay 1, and thence to the train-line conductor B—, and, a similar circuit being completed through the operating coils of the switches A2, B2, C2. Therefore, these motor-circuit switches are closed and, subsequently, the master controller MC1 may be operated to gradually eliminate the resistance from the secondary windings of the respective driving motors M1 and M2, whereby said motors are permitted to accelerate and propel the locomotive. Obviously, my invention is independent of the particular form of adjustable resistor for governing the operation of the motors M1 and M2 and of the means for controlling the same.

Assuming that the electric locomotive is in operation as described and that, for some reason, the voltage of the source fails for an instant: immediately upon the failure of voltage, the supply transformers T1 and T2 become deënergized, as well as the small auxiliary transformers 21 which are connected on the ground side thereof. Therefore, the deënergization of the fast relay 1 and the fast relay 2 is effected and said relays are at once permitted to drop to interrupt the control circuits which are interlocked through them. The disengagement of the upper set of contact members 67′ of the fast relay 1 opens the energizing circuit of the balancing switches $b1$ and $e1$, while the energizing circuits of the switches $b2$ and $e2$ of the equipment of unit U2 are similarly interrupted by the disengagement of the upper set of contact terminals 67″ of the fast relay 2. The balancing switches $b1$, $e1$ and $b2$ and $e2$ of the respective unit equipments U1 and U2 are, therefore, deënergized and opened to disconnect the generator windings 13 of the several phase converters PC1 and PC2 from the supply transformers T1 and T2, while the exciting windings 12 thereof are maintained connected to the supply transformers through the connecting switches $g1$ and $g2$ and through the current-limiting choke coils CC1 and CC2.

The deënergization of fast relay 1 and the resulting separation of its lower set of contact members 63′ effects the interruption of the energizing circuit for the actuating coils of the motor-circuit switches A1, B1 and C1, while fast relay 2 effects the deënergization of the operating coils of motor-circuit switches A2, B2 and C2 in a similar manner. Thus, the motor-circuit switches A1, B1 and C1 and A2, B2 and C2 are opened to disconnect the respective driving motors M1 and M2 of the respective locomotive half-units, whereby the load is entirely cut off.

The exciting windings 12 of the several phase converters PC1 and PC2, being still connected to the respective supply transformers by the connecting switches $g1$ and $g2$, said converters will be caught and again brought up to synchronous speed provided the failure of voltage is of only instantaneous duration, inasmuch as, in this short period, the deceleration or retardation of the phase converters will not be sufficient to prevent them being brought up to speed again without injurious effects being developed therein.

Obviously, it would be disastrous to throw full-line voltage upon the phase converters after an appreciable period of no voltage during which the converter speed had been reduced a material amount and, therefore, the slow relays are employed for entirely disconnecting the phase converters from their supply transformers when the failure of voltage obtains over a period of five or six seconds, as will be now set forth.

Under these conditions, the fast relays will at once be deënergized and the driving motors M1 and M2 disconnected, as well as the balancing switches being opened. However, the inertia of the rotors of the phase converters PC1 and PC2 is sufficient to drive the same as generators for a short period, and, during this period, I have found by experience that the converters actually regenerate a small amount of current for five or six seconds. It is this regenerated current which is relied upon to traverse the respective slow relay coils and to hold them in their raised or closed positions for a short time interval. If the failure of voltage continues beyond this interval, the several slow relays become deënergized and drop to interrupt the energizing circuits of the respective connecting switches $g1$ and $g2$ of the several equipments. These switches $g1$ and $g2$, therefore, are opened to entirely disconnect the phase converters PC1 and PC2 from their supply transformers, in which event, said converters can only be thrown upon the line again by bringing them up to speed through the agency of their starting motors, in the manner hereinbefore described.

If, however, the failure of voltage is only instantaneous, and power is restored to the system at once, the respective fast relays are again energized and actuated to at once reclose the balancing switches $b1$ and $e1$ and $b2$ and $c2$, or whatever balance switches are being employed, as well as to reclose the motor-circuit switches A1, B1, C1, and A2, B2 and C2, whereby the operating motor-circuit connections are again reëstablished, and normal operation is at once resumed without necessitating the restarting of the phase converters.

For purposes of explanation, let it be assumed that the load upon the locomotive is heavy. In this case, it becomes necessary to employ different connections of the phase converters to the supply transformers in order to maintain balanced voltage relations and to compensate for phase distortion under load conditions. Therefore, the balancing switch 1 should be moved into its position "Acc. 2". The result of this preliminary adjustment is to effect the utilization of the balancing switches $c1$ and $f1$ and $c2$ and $f2$ in lieu of the switches $b1$, $e1$, $b2$ and $e2$, the employment of which increases the excitation of the phase converters PC1 and PC2 for building up the voltage, and shifts the T-connection of the converter generator windings 13 to compensate for the increased phase distortion under heavy loads. It is not deemed necessary to trace the various circuit connections established with this setting of the balancing switch 1 in view of their similarity to those already described in detail and because of their simplicity.

If the electric locomotive and its train is coasting down a grade and it is desired to hold down the speed or brake the train by regenerating energy to the line, the balancing switch 1 should be moved to its position "Reg.", in which case, the balancing switches $a1$ and $d1$ and $a2$ and $d2$ are employed for connecting the phase converters PC1 and PC2 to the supply transformers T1 and T2. These connections are particularly adapted to maintain balanced-voltage conditions during periods of regeneration. No description of the specific circuit connections is deemed necessary.

In the operation hereinbefore described, both of the phase converters PC1 and PC2 have been employed. It is possible, however, as already stated, to operate both of the unit equipments U1 and U2 from either one of the phase converters, if found necessary or desirable for any reason whatsoever. The phase converter PC1, therefore, will be considered disabled, and the operation of the system will be set forth under such conditions, that is, so far as the operation differs from that already described in detail. If the control is to be effected from the unit U1 as has been already assumed, the cutout switch 1 is moved to its position marked "front out" which indicates that the phase converter of the front half-unit U1 is to be cut out of circuit. The operation of the system thereafter will be substantially similar to that already set forth with the exception that, inasmuch as cutout switch 1 occupies its "front out" position, the movable conducting segment 34' thereof disengages the stationary contact terminals $z'$ and 36', in which case, the energizing circuit for the connecting switch $g1$ is interrupted. It is, therefore, impossible to energize this switch and connect the phase converter PC1 to its supply transformer T1.

Both phase converters PC1 and PC2 are, however, brought up to speed by their starting motors SM1 and SM2 in the usual way, although only the phase converter PC2 of the unit U2 equipment is thrown on to the line, as will be understood. The other phase converter PC1 is permitted to come to rest as soon as the starting switch 1 is returned to its "off" position. The remainder of the operation corresponds closely to that already described.

Similarly, if it is desired to operate from the phase converter PC1 alone, the cutout switch 1 is moved into its "rear out" position, in which the energizing circuit for the connecting switch $g2$ is interrupted and, therefore, only the connecting switch $g1$ can be closed to connect the phase converter PC1 to the line, as will be understood without further exposition thereof.

Inasmuch as the control equipments of the several locomotive half-units U1 and U2 are in duplicate, it is, of course, equally possible to control the operation from unit U2 instead of unit U1, and, without further description, it will be understood that the corresponding switches may be manipulated in the same manner and will function to accomplish the same general results as have been hereinbefore set forth fully in connection with the control of the locomotive from the unit U1.

Although I have shown and described my invention as embodying more or less specific circuit connections, control devices and arrangement and location of control apparatus, the benefits thereof may be derived through the employment of many modifications of what is herein set forth and, therefore, I desire that only such limitations shall be imposed as are indicated in the appended claims.

I claim as my invention:

1. In a system of multiple-unit control, the combination with a plurality of units each comprising a supply circuit, a dynamo-electric machine, switching means for effecting the circuit connections of said dynamo-electric machine to said supply circuit, and controllable means for governing the operation of said switching means, of means for rendering the operation of the controllable means of one unit ineffective for governing purposes when the controllable means of the other unit is employed.

2. In a system of multiple-unit control, the combination with a plurality of units each comprising a supply circuit, a dynamo-electric machine, a plurality of switching devices for connecting said machine to said supply circuit, and controllable means for governing the operation of said switching means, of auxiliary means associated with each unit and including interlocking means for rendering the operation of the controllable means of one unit ineffective for governing purposes when said auxiliary means of the other unit is utilized.

3. In a system of multiple-unit control, the combination with a plurality of units each comprising a dynamo-electric machine, a plurality of electrically-operated switches, circuit connections and master switches for governing the operation of said machine, of auxiliary means embodying interlocking means for adjusting the control-circuit connections of said switches and for confining the control of said switches to a single unit.

4. In a system of multiple-unit control, the combination with a plurality of units each comprising a dynamo-electric machine, and electrically-operated unit switches, circuit connections and master switches for governing the operation of said dynamo-electric machine, of a plurality of electrically-controlled interlocking means severally associated with the respective units for governing the control-circuit connections thereof, and an auxiliary switching device associated with each unit and adapted to be actuated in accordance with the particular unit from which the system is to be controlled, for effecting the actuation of the interlocking means in accordance therewith, to render the master switches of the other unit ineffective for purposes of control.

5. In a system of multiple-unit control, the combination with a plurality of separate units each comprising a dynamo-electric machine and a plurality of electrically-operated unit switches, circuit connections and master switches for governing the operation of said dynamo-electric machine, of interlocking means for adjusting said circuit connections, and means associated with the reverser of each unit for governing the operation of said interlocking means and confining the control of the system to the master switches of one of the units.

6. In a system of multiple-unit control, the combination with a plurality of unit equipments each comprising a dynamo-electric machine, means for governing the operation thereof, and controllable means for controlling said governing means, of auxiliary means for confining the control of said governing means to the controllable means of a single unit equipment.

7. In a system of control, the combination with a supply-circuit, a phase converter, switching means for connecting said phase converter to said supply circuit, a starting motor for bringing said phase converter up to speed, and a switch for connecting said starting motor to the supply circuit, of a master starting switch adapted, in one position, to close said last switch to cause said starting motor to accelerate said converter and, in another position, to cause said switching means to connect the phase converter to said supply circuit.

8. In a system of multiple-unit control, the combination with a plurality of unit control equipments each comprising a supply circuit, a phase converter, and switching means for connecting said phase converter to said supply circuit, of a master switch and control-circuit connections associated therewith and with said switching means for determining whether one or all of the phase converters are to be connected to the supply circuits, and a master switch and control-circuit connections for effecting the closure of the switching means of the unit or units as determined by said last mentioned master switch, whereby one or all of the converters may be connected to the respective supply circuits.

9. In a system of multiple-unit control, the combination with a plurality of unit equipments each comprising a supply circuit, a dynamo-electric machine, a set of unit switches for adjusting the circuit connections of said machine to said supply circuit, a master switch for determining the particular unit switches to be operated under different conditions of operation, and a second master switch for determining the particular unit equipment or equipments, the unit switches of which are to be operated, of interlocking means associated with the several unit equipments for rendering the master switches of one of the unit equipments inoperative when the system is being controlled by the master switches of the other unit equipment.

10. In a system of multiple-unit control, the combination with a plurality of units each comprising a transformer, a phase converter, a plurality of unit switches for effecting the circuit connections of said converter to said transformer, and a switching device for energizing certain of said unit switches, of means for preventing the operation of the switching device of one unit when the switching device of the other unit is operated.

11. The combination with a plurality of units comprising a multiple-unit equipment, each of which comprises a transformer, a phase converter, a plurality of unit switches for connecting said converter to said transformer, and a manually-operated master switch for governing the operation of said unit switches, of interlocking means associated with the several units for rendering the operation of the master switch of one of the units inoperative when the master switch of the other unit occupies an operative position.

12. The combination with a plurality of units comprising a multiple-unit equipment, each of which comprises a transformer, a phase converter, a plurality of unit switches for connecting said converter to said transformer, and a manually-operated master switch for governing the operation of said unit switches, of a plurality of electrically-controlled interlocking switches associated with the several units and acting in conjunction to confine the control of the unit switches to one of the units under operating conditions.

13. In a system of multiple-unit control, the combination with a plurality of unit equipments each comprising a transformer, a phase converter, a motor for starting said phase converter, and a manually-operated master switch for governing the starting operation, whereby the starting motors of each unit equipment may be operated concurrently from any of said units, of electrically-controlled interlocking means associated with each of the units and acting in conjunction to render the master starting switch of one of the units inoperative when the master starting switch of the other unit is operative.

14. The combination with a plurality of unit control equipments adapted for multiple operation and each comprising a transformer, a phase converter, a plurality of unit switches for connecting said converter to said transformer, a starting motor associated with said converter for bringing said converter up to speed, and a plurality of master switches for respectively governing the operation of said starting motor and said unit switches, of automatic means associated with the several units for interlocking said starting motors and said unit switches, whereby the master switches of one of the units is rendered inoperative when a master switch of the other unit is being utilized.

15. In a multiple-unit control system, the combination with a plurality of unit equipments each comprising a transformer, a phase converter adapted to be connected thereto, a starting motor for bringing said phase converter up to speed, an electrically-controlled starting switch for governing the operation of said starting motor, and a master starting switch for controlling said main starting switch and causing the motor to bring the converter up to speed, of interlocking means associated with the several units for preventing the operation of both master starting switches at the same time.

16. The combination with a plurality of unit control equipments each comprising a transformer, a phase converter, a set of unit switches for connecting said phase converter to said transformer, a master switch for controlling the operation of the unit switches of all equipments, and a second master switch for determining the particular sets of unit switches that are controlled by said first master switch, of means for automatically interlocking the switches of the several unit equipments to prevent the concurrent control of both equipments by their respective master switches.

17. In a system of multiple-unit control, the combination with a plurality of unit equipments each comprising a transformer, a phase converter, a set of unit switches for connecting the converter to said transformer, and a starting motor for bringing said converter up to speed, of a plurality of master switches associated with each unit equipment for governing the operation of any or all of the sets of unit switches or starting motors.

18. The combination wtih a plurality of unit equipments adapted for multiple-unit operation and each comprising a transformer, a phase converter, a plurality of unit switches for connecting said phase converter to said transformer, a master switch for determining which of said unit switches are to be closed under different conditions of operation, and a second master switch for determining the particular unit equipment or equipments the unit switches of which are to be operated, of interlocking means associated with the several equipments for rendering the master switches of one of the equipments inoperative when the system is being controlled by the master switches of the other equipment.

19. In a multiple-unit system of control, the combination with a plurality of unit equipments each of which comprises a transformer, a phase converter and a plurality of unit switches for connecting said phase converter to said transformer, of a manually-operated master switch associated with each equipment for governing the operation of all of said unit switches, and a second master switch for determining which of the control equipments are to be operated.

20. In a system of multiple-unit control, the combination with a plurality of units each comprising a supply circuit, a dynamo-electric machine, and means for governing the circuit connections of said machine to said supply circuit, of means for rendering the governing means of one unit ineffective for operating purposes when the governing means of the other unit is employed for selectively operating the various dynamo-electric machines.

21. In a system of multiple unit control, the combination with a plurality of units each comprising a dynamo-electric machine, and circuit connections for governing the operation of said machine, of auxiliary means for manipulating said circuit connections and for confining the control thereof to a single unit.

22. In a system of multiple-unit control, the combination with a plurality of unit equipments, each of which comprises a supply circuit, a dynamo-electric machine, and switching means for connecting said machine to said supply circuit, of a master switch associated with each equipment for governing the operation of all of said switching means, and a second master switch for permitting selection of the control equipments to be operated.

In testimony whereof, I have hereunto subscribed my name this 27th day of Aug. 1915.

ARTHUR J. HALL.